US006493594B1

(12) United States Patent
Kraml

(10) Patent No.: US 6,493,594 B1
(45) Date of Patent: Dec. 10, 2002

(54) SYSTEM AND METHOD FOR IMPROVED SOFTWARE CONFIGURATION AND CONTROL MANAGEMENT IN MULTI-MODULE SYSTEMS

(75) Inventor: Mark H. Kraml, Flanders, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/326,095

(22) Filed: Jun. 4, 1999

(51) Int. Cl.[7] .................. G05B 11/01; G06F 15/177
(52) U.S. Cl. .................. 700/19; 700/9; 700/86; 709/221; 717/170
(58) Field of Search .................. 700/1, 9, 19, 86, 700/87; 710/8, 14; 709/221; 717/168, 170–172

(56) References Cited

U.S. PATENT DOCUMENTS

| | | | | |
|---|---|---|---|---|
| 4,639,852 A | * | 1/1987 | Motomiya | 700/9 |
| 5,155,847 A | * | 10/1992 | Kirouac et al. | 709/221 |
| 5,586,304 A | * | 12/1996 | Stupek, Jr. et al. | 717/170 |
| 5,845,090 A | * | 12/1998 | Collins, III et al. | 709/221 |
| 6,282,712 B1 | * | 8/2001 | Davis et al. | 717/170 |
| 6,298,480 B1 | * | 10/2001 | Beuk et al. | 709/217 |
| 6,385,494 B1 | * | 5/2002 | Blahnik et al. | 700/86 |
| 6,385,668 B1 | * | 5/2002 | Gaddess et al. | 710/8 |

* cited by examiner

Primary Examiner—Maria N. Von Buhr
Assistant Examiner—Paul Rodriguez
(74) Attorney, Agent, or Firm—Cohen Pontani Lieberman & Pavane

(57) ABSTRACT

The system and method of the invention automatically provide appropriate configuration and control software to a hardware system consisting of multiple target hardware modules. A system controller is connected to the target hardware modules and to a repository that stores a set of software modules. Each software module includes configuration and control information for a particular target hardware module. When a particular software control and configuration scheme for at least a portion of the target hardware modules is to be implemented in the hardware system, software modules corresponding to the particular software control and configuration scheme are selected and associated with a system definition file that is also stored in the repository. When the system definition file is invoked by the system controller, the system controller executes the associated software modules thereby providing the particular software control and configuration scheme to appropriate target hardware modules. When the particular software control and configuration scheme needs to be updated, one or more software modules of the system definition file may be replaced with an updated version without reconfiguring the hardware system.

14 Claims, 2 Drawing Sheets

SYSTEM AND METHOD FOR IMPROVED SOFTWARE CONFIGURATION AND CONTROL MANAGEMENT IN MULTI-MODULE SYSTEMS

BACKGROUND OF THE INVENTION

1. Field of the Invention

The present invention relates to a system and method for improving software configuration and control management in a hardware system. More particularly, the invention is directed to a system and method for automatically providing appropriate configuration and control software to a hardware system consisting of a controller and multiple target hardware modules connected thereto.

2. Description of the Related Art

Hardware systems having a controller and multiple hardware modules are in common use in the computer and communication industries. For example cellular telecommunication networks are complex systems composed of large numbers of base stations and repeaters connected to a control unit. In another example, local area networks typically include a central server with multiple computer work stations connected thereto.

A typical previously known multi-module hardware system is controlled by a complex system software module having various components with control and configuration information for each of the system's hardware modules. However, this approach suffers from a serious disadvantage. Because hardware systems are often continuously upgraded or changed by adding new hardware modules and/or improving existing hardware modules, it is necessary to either replace the entire system software module with a new system software version or to provide a supplemental software module of comparable complexity to the original software module in order to provide proper control and configuration information for the new and/or improved hardware modules. Such software replacement and/or supplementation is a complex and time consuming task requiring dedication of significant hardware system and technical personnel resources. In addition, these software replacement problems also apply to more frequently performed software upgrades to enhance the features of the software, or the updating of existing software to fix bugs or faults. Another disadvantage of previously known hardware systems is that when a particular system software function is added or upgraded, it is necessary to replace the entire system software module.

It would thus be desirable to provide a system and method for automatically providing appropriate configuration and control information to a multi-module hardware system when the hardware system is updated or the functionality of the hardware system is changed without replacement of the system software module. It would further be desirable to effectively manage changes in desirable configuration and control schemes for a multi-module hardware system.

SUMMARY OF THE INVENTION

The disadvantages and limitations discussed above are overcome by the present invention. The system and method of the invention automatically provide appropriate configuration and control information to a multi-module hardware system when the hardware system is updated or the functionality of the hardware system is changed without replacement of the system software module.

In accordance with the invention a hardware system is provided with a system controller, such as a computer network server or a wireless communication controller, for controlling operation and configuration of the hardware system, a set of target hardware modules, such as computer workstations or wireless communication base stations, for performing a variety of functions such as executing end-user software applications or routing wireless communication signals, and a system repository for storing various software modules, each software module containing configuration and functionality (i.e. control) information for a particular target hardware module. Each software module also includes an information record with one or more of the following data items: software module name, software module version, software module last revision date, the name of the particular target hardware module for which the software module is intended, a software module signature representative of integrity of control and configuration information of the software module, and software module source information representative of a repository location in which the software module is stored.

In contrast to previously known hardware systems, instead of a system control module, a system definition file, representative of a desired configuration and functionality scheme for the hardware system or a portion thereof is defined by the system controller and stored in the system repository. The system controller then selects a set of software modules that together provide the desired configuration and functionality information and associates the software module set with the system definition file. When the system definition file is invoked by the system controller, the associated software modules are executed to provide desired configuration and functionality (i.e. control) information to appropriate target hardware modules of the hardware system, thereby automatically configuring and providing desired functionality to the hardware system.

Multiple system control modules corresponding to different hardware system configurations and functions may readily be defined and stored in the system repository. Advantageously, the software modules may be shared by various system definition files as is necessary or appropriate, thus improving the hardware system performance and reducing system repository storage requirements. When the hardware system is upgraded or changed such, for example, as by adding a new target hardware module, one or more of the software modules may be upgraded or changed by the system controller to a different version without having to reconfigure or replace the system definition file with which the one or more software modules are associated. Even when the hardware system is not changed, one or more of the software modules may be upgraded or changed by the system controller to a different version to enhance the features of the software or to fix bugs or faults in the existing software. Similarly, when implementing a new configuration and/or functionality scheme in the existing hardware system, one or more new software modules may be added to the system repository and a new system definition file may be defined by the system controller to include the new software module or modules and to thereby implement the new configuration and/or functionality scheme. Finally, when a new desired hardware system configuration and/or functionality scheme does not require new software modules, an existing system definition file may be redefined by the system controller by changing the listing of invoked software modules in the associated software module set. In order to prevent an inappropriate or unauthorized system definition file from being invoked by the system controller, each software definition file optionally includes a security record that is checked by the system controller before the software definition file is invoked. If the security record is correct, then the system controller invokes the software definition file. If the security record is not correct, then the system controller does not invoke the software definition file.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF THE PRESENTLY PREFERRED EMBODIMENTS

While the system and method of the present invention are described with reference to three target hardware modules connected to a system controller, it should be understood that any number of target hardware modules, subject only to technical hardware limitations, may be connected to the system controller without departing from the spirit of the invention.

Figure 1:
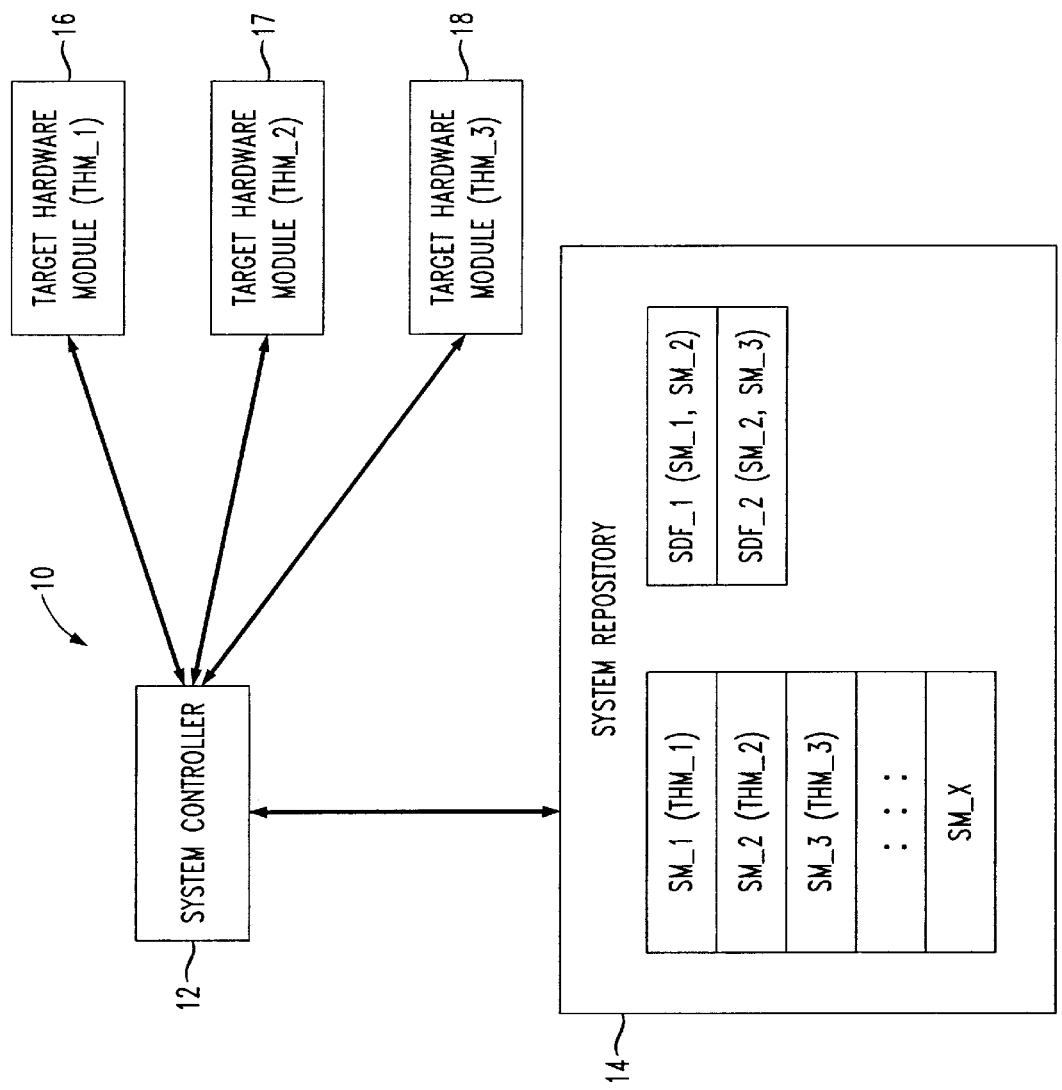
FIG. 1 is a schematic block diagram of a multi-module hardware system in accordance with the present invention.

Referring now to the drawings, and initially to FIG. 1 thereof, a multi-module hardware system 10 is shown. The system 10 includes a system controller 12, such as a computer network server or a wireless communication controller, for controlling operation and configuration of the hardware system 10, a set of target hardware modules 16, 17, 18, such as computer workstations or wireless communication base stations, for performing a variety of functions such as executing end-user software applications or routing wireless communication signals, and a system repository 14 for storing various software modules SM_1 through SM_X and other data.

Figure 2:
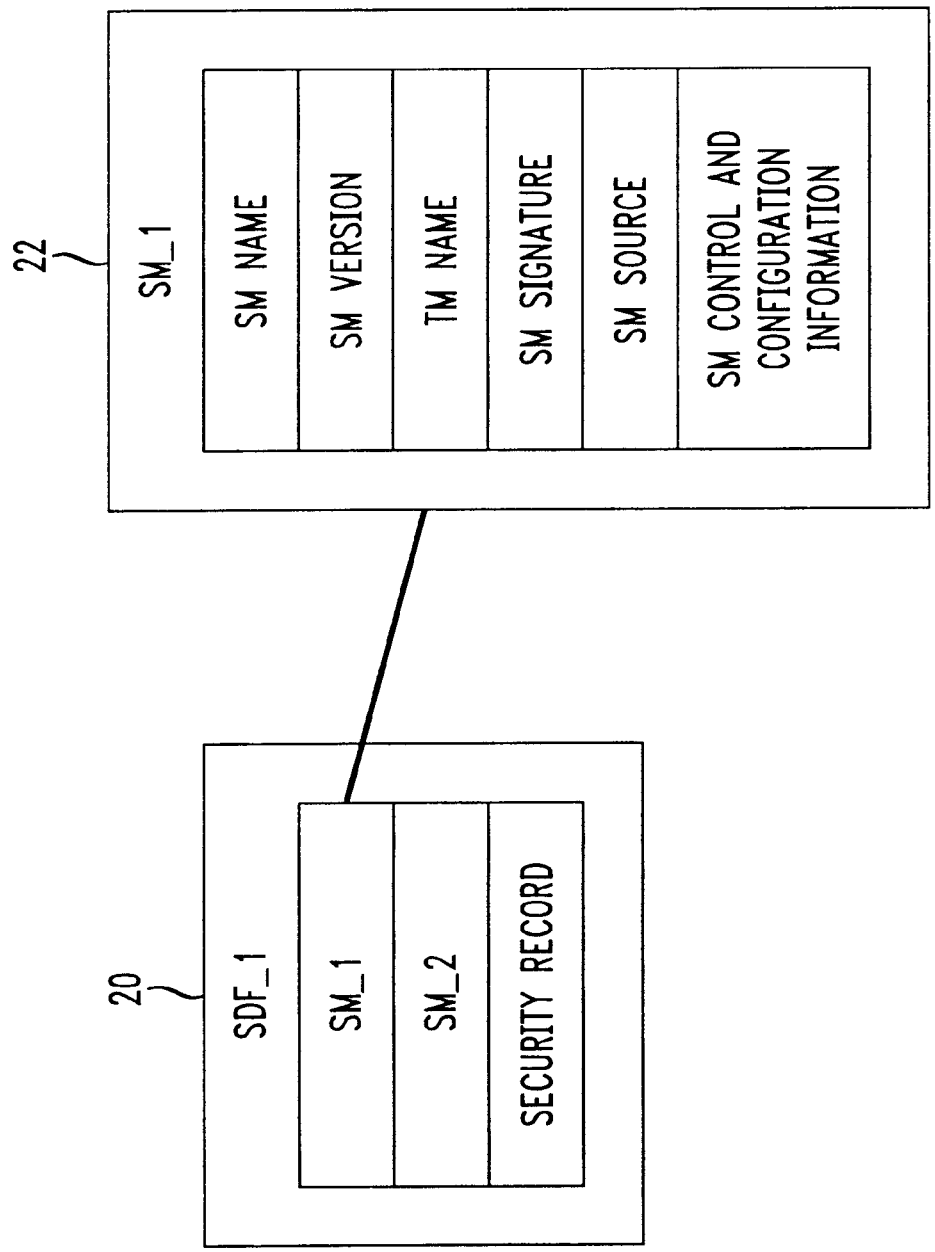
FIG. 2 is a block diagram representative of an exemplary system definition file and an exemplary software module executed by a system controller of the hardware system of FIG. 1, in accordance with the principles of the present invention.

Each software module SM_1 through SM_X may be defined using the system controller 12 and contains configuration and functionality (i.e. control) information for a particular target hardware module 16, 17 or 18, such that when a software module is executed by the system controller 12 the configuration and functionality information is loaded into the particular target hardware module. An exemplary software module SM_1 22 is shown in FIG. 2. In addition to configuration and functionality information, the software module SM_1 22 also includes an information record with one or more of the following data items: software module name, software module version, software module last revision date, the name of the particular target hardware module for which the software module is intended (for example, the target hardware module 16), a software module signature representative of integrity of control and configuration information of the software module, and software module source information representative of a location in the system repository 14 in which the software module is stored. The information record is important for facilitating identification and selection of the software module SM_1 22 by the system controller 12.

The system repository 14 may be distributed throughout the system, and as such, references to software modules or system definition files may include references to repositories located in distinct physical repositories. These references need not be absolute, and the system that accesses the data based on the reference may need to search the repositories to locate the one that contains the specifically desired component. An associated software library (not shown) would be created to search the repositories.

In contrast to previously known hardware systems, instead of a system control module, a system definition file SDF_1, representative of a desired configuration and functionality scheme for the hardware system 10 or a portion thereof, is defined by the system controller 12 and stored in the system repository 14. The system controller 12 then selects a set of software modules, for example SM_1 and SM_2, that together provide information for the desired configuration and functionality scheme and associates the software module set with the system definition file SDF_1. An exemplary system definition file SDF_1 20 with associated software modules SM_1 and SM_2 is shown in FIG. 2. It should be understood that any number of additional system definition files for various configuration and functionality schemes for the hardware system 10 may be defined by the system controller 12 and stored in the system repository 14 as a matter of design choice.

To implement a particular desired configuration and functionality scheme, the system controller 12 invokes an appropriate system definition file, such as SDF_1, and then executes the associated software modules (such as SM_1 and SM_2) to provide desired configuration and functionality information to appropriate target hardware modules (such as modules 17 and 18) of the hardware system 10, thereby automatically configuring and providing desired functionality to the hardware system 10. The associated software modules (e.g., SM_1 and SM_2) executed as a result of the invocation of a particular system definition file may themselves further reference another entry in the system definition file for the particular desired configuration. Thus, the subsequently referenced software modules may again refer to another entry in the system definition file for more files to be loaded. This enables a fully dynamic system to be defined using the system definition file to insure that all required, possible and/or needed modules are present in the repository.

The system definition file (e.g., SDF_1) is not only used to provide various software modules to the respectively associated hardware modules, but are also used by abstract modules, which are generally other hardware or software modules. An abstract module (hardware or software) can access the system definition file SDF_1 to request a reference to a module that it needs to operate. When the desired module is located in an identified system definition file, a reference or pointer to that desired module is given to the abstract component. Once again, the abstract module may be hardware or software and can result in the execution of any software module that may in turn invoke more searches for other references in the system definition file. This process continues until the system is fully configured and running. The abstract module may also represent a "black box" type of component in the system.

In further embodiments, when queried, the system definition file may itself refer to other definition files and when examined, the complete chain of system definition files is searched for module names in order to find the desired reference. This embodiment is contemplated for use in large systems where some structure or hierarchy of system definition files is present. This provides a maintenance construction that serves to structure the system definition file into manageable parts of related modules.

When the hardware system 10 is upgraded or changed, such, for example as by adding a new target hardware module (not shown), one or more software modules may be upgraded or changed by the system controller 12 to a different version without having to reconfigure or replace the system definition file with which the one or more software modules are associated. Similarly, when implementing a new configuration and/or functionality scheme in the existing hardware system 10, one or more new software modules, such as software module SM_3, may be added to the system repository 14 and a new system definition file SDF_2 may be defined by the system controller 12 to include the new software module SM_3 to thereby implement the new configuration and/or functionality scheme. Finally, when a new desired hardware system configuration and/or functionality scheme does not require new software modules, an existing system definition file such as SDF_1 may be redefined by the system controller 12 by changing the software modules in the associated software module set. For example, the system definition file SDF_1 may be redefined and associated with software modules SM_1 and SM_3. Advantageously, the software modules SM_1 to SM_X may be shared by various system definition files, such as SDF_1 and SDF_2, as is necessary or appropriate, thus improving performance of the hardware system 10 and reducing the storage requirements of the system repository 14.

In order to prevent an inappropriate or unauthorized system definition file from being invoked by the system controller 12, each software definition file preferably includes a security record that is checked by the system controller 12 before the software definition file is invoked. If the security record is correct, then the system controller 12 invokes the software definition file. If the security record is not correct, then the system controller 12 does not invoke the software definition file.

In accordance with the present invention, configuration and functionality of the hardware system 10 and its target hardware modules may be automatically and effectively managed by selecting appropriate software modules and associating them with one or more system definition files for later invocation by the system controller 12.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A system for providing an appropriate software control and configuration scheme to a multi-module system having a system controller and a plurality of target hardware modules connected to the system controller, comprising:

a plurality of software modules, each of said plurality of software modules comprising configuration and control information for a particular target hardware module from said plurality of target hardware modules;

a software module editor for at least one of editing and creating at least one of said plurality of software modules;

at least one system definition file representative of a particular software control and configuration scheme for the multi-module system, wherein the particular software control and configuration scheme comprises at least a portion of said plurality of software modules;

a system definition file editor for at least one of editing and creating said at least one system definition file;

selection means in the system controller for selecting one of said at least one system definition file, said selected system definition file corresponding to a desired particular configuration and control scheme; and repository means connected to the system controller for storing said plurality of software modules and said at least one system definition file;

wherein the system controller is operable for executing said selected system definition file by loading the software modules which comprise said desired particular configuration and control scheme into at least a portion of said plurality of target hardware modules; and wherein, when a new target hardware module is added to the multi-module system, a new software module comprising configuration and control information for the new target hardware module is created using the software module editor and at least one of:

a new system definition file is created using the system definition file editor, where the new system definition file includes the new software module in the particular software control and configuration scheme of the new system definition file; and at least one of the at least one system definition file is edited to include the new software module in the particular software control and configuration scheme of the edited at least one system definition file.

2. The system of claim 1, wherein each software module of said plurality of software modules further comprises at least one of a software module name, a software module version, a software module last revision date, a target hardware module name representative of said particular target hardware module, a software module signature representative of integrity of control and configuration information of said software module, and software module source information representative of a location in which said repository means stores said software module.

3. The system of claim 1, wherein said software module editor is defining a new version of a particular software module of said plurality of software modules.

4. The system of claim 3, wherein said system definition file editor is for at least one of creating a new system definition file referencing the new version of the particular software module, and editing at least one system definition file to reference the new version of the particular software module.

5. The system of claim 1, wherein each said at least one system definition file further comprises a security record representative of authenticity of said system definition file, and wherein the system controller comprises means for verifying said security record prior to execution of said system definition file so that the system controller executes said system definition file only when said security record is verified.

6. The system of claim 1, wherein said repository means comprises at least one memory operably connected to said system controller.

7. The system of claim 1, wherein the multi-module system comprises a wireless communication system, the system controller comprises a Base Station Controller, and the target hardware modules comprise Base Stations and repeaters.

8. A method for providing a desired software configuration and control scheme to a multi-module system having a system controller, a plurality of target hardware modules connected to the system controllers and a memory, comprising the steps of:

(a) defining a plurality of software modules, each of the plurality of software modules comprising configuration and control information for a particular target hardware module from said plurality of target hardware modules;

(b) defining at least one system definition file representative of a particular software control and configuration scheme for the multi-module system, wherein the particular software control and configuration scheme comprises at least a portion of said plurality of software modules;

(c) selecting one of at least one system definition file, said selected system definition file corresponding to said desired configuration and control scheme, wherein said plurality of software modules and said at least one system definition file are stored in the memory;

(d) executing by the system controller said selected system definition file by loading the software modules which comprise said desired configuration and control scheme into at least a portion of said plurality of target hardware modules;

(e) adding a new target hardware module to the multi-module system;

(f) creating a new software module comprising particular configuration and control information for the new target hardware module; and (g) at least one of:
creating a new system definition file including the new software module in the particular software control and configuration scheme of the new system definition file; and editing at least one of the at least one system definition file to include the new software module in the particular software control and configuration scheme of the edited at least one system definition file.

9. The method of claim 8, wherein each software module of said plurality of software modules further comprises at least one of a software module name, a software module version, a software module last revision date, a target hardware module name representative of said particular target hardware module, a software module signature representative of integrity of control and configuration information of said software module, and software module source information to allow the software module to be located in the memory.

10. The method of claim 8, further comprising the steps of:
defining a new version of a particular software module of said plurality of software modules; and
replacing said particular software module stored in the memory with said new version.

11. The method of claim 10, wherein said step of replacing comprises creating a new system definition file referencing the new version of the particular software module.

12. The method of claim 8, wherein each said at least one system definition file further comprises a security record representative of authenticity of said at least one system definition file, and wherein said step (d) comprises the step of:
verifying said security record prior to execution of said selected system definition file so that said selected system definition file is executed only when said security record is verified.

13. The method of claim 8, wherein step (f) comprises the step of:
editing at least one of the plurality of software modules in order to create a new software module comprising configuration and control information for the new target hardware module.

14. The method of claim 8, wherein the multi-module system comprises a wireless communication system, the system controller comprises a Base Station Controller, and the target hardware modules comprise Base Stations and repeaters.

* * * * *